United States Patent
Lee et al.

(10) Patent No.: US 11,658,364 B2
(45) Date of Patent: May 23, 2023

(54) BATTERY MODULE WITH IMPROVED SAFETY, BATTERY PACK INCLUDING THE BATTERY MODULE AND VEHICLE INCLUDING THE BATTERY PACK

(71) Applicant: LG CHEM, LTD., Seoul (KR)

(72) Inventors: Han-Young Lee, Daejeon (KR); Kyung-Min Lee, Daejeon (KR); Bum-Young Jung, Daejeon (KR); Jeong-Ho Ha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/049,914

(22) PCT Filed: Nov. 7, 2019

(86) PCT No.: PCT/KR2019/015085
§ 371 (c)(1),
(2) Date: Oct. 22, 2020

(87) PCT Pub. No.: WO2020/116799
PCT Pub. Date: Jun. 11, 2020

(65) Prior Publication Data
US 2021/0242548 A1 Aug. 5, 2021

(30) Foreign Application Priority Data
Dec. 7, 2018 (KR) .................. 10-2018-0157556

(51) Int. Cl.
*H01M 50/249* (2021.01)
*H01M 50/178* (2021.01)
(Continued)

(52) U.S. Cl.
CPC ....... *H01M 50/249* (2021.01); *H01M 50/105* (2021.01); *H01M 50/178* (2021.01);
(Continued)

(58) Field of Classification Search
CPC .......................................... H01M 2200/10–20
See application file for complete search history.

(56) References Cited

U.S. PATENT DOCUMENTS

| 6,889,433 B1 | 5/2005 | Enomoto et al. |
| 2012/0270094 A1* | 10/2012 | Hohenthanner .... H01M 50/291 429/158 |

(Continued)

FOREIGN PATENT DOCUMENTS

| CN | 105492201 A | 4/2016 |
| EP | 2 662 913 A1 | 11/2013 |

(Continued)

OTHER PUBLICATIONS

Machine translation of KR 20130064031 A (Year: 2013).*

(Continued)

*Primary Examiner* — Matthew T Martin
*Assistant Examiner* — Unique Jenevieve Luna
(74) *Attorney, Agent, or Firm* — Birch, Stewart, Kolasch & Birch, LLP

(57) ABSTRACT

A battery module improves safety by blocking current when the temperature rises, a battery pack includes the battery module, and a vehicle includes the battery pack. The battery module includes two or more battery cells, an electrode assembly having both ends respectively connected to one ends of electrode leads of opposite polarities in a pouch case together with an electrolyte and other ends of the electrode leads are exposed to an outside of the pouch case, wherein the electrode leads and a bus bar connecting a first battery cell and a second battery cell, wherein the bus bar comprises a metal layer and a material layer that is normally conductive but may act as a resistor when a temperature rises, and wherein the material layer comprises a gas generating material that is decomposed at a certain temperature or higher to generate a gas and increase resistance.

13 Claims, 8 Drawing Sheets

(51) Int. Cl.
| | |
|---|---|
| *H01M 50/211* | (2021.01) |
| *H01M 50/244* | (2021.01) |
| *H01M 50/51* | (2021.01) |
| *H01M 50/522* | (2021.01) |
| *H01M 50/505* | (2021.01) |
| *H01M 50/503* | (2021.01) |
| *H01M 50/526* | (2021.01) |
| *H01M 50/50* | (2021.01) |
| *H01M 50/105* | (2021.01) |
| *H01M 50/574* | (2021.01) |

(52) U.S. Cl.
CPC ....... *H01M 50/211* (2021.01); *H01M 50/244* (2021.01); *H01M 50/50* (2021.01); *H01M 50/503* (2021.01); *H01M 50/505* (2021.01); *H01M 50/51* (2021.01); *H01M 50/522* (2021.01); *H01M 50/526* (2021.01); *H01M 50/574* (2021.01); *H01M 2200/10* (2013.01); *H01M 2220/20* (2013.01)

(56) References Cited

U.S. PATENT DOCUMENTS

| | | |
|---|---|---|
| 2013/0130572 A1 | 5/2013 | Sakae |
| 2014/0186664 A1 | 7/2014 | Park |
| 2016/0211587 A1 | 7/2016 | Yamazaki et al. |
| 2017/0098814 A1 | 4/2017 | Golubkov |
| 2017/0237060 A1 | 8/2017 | Inoue et al. |

FOREIGN PATENT DOCUMENTS

| | | | |
|---|---|---|---|
| EP | 3 588 623 A1 | 1/2020 | |
| JP | 7-7023 A | 1/1995 | |
| JP | 2014-130794 A | 7/2014 | |
| JP | 2016-225065 A | 12/2016 | |
| KR | 10-2012-0070851 A | 7/2012 | |
| KR | 10-2013-0064031 A | 6/2013 | |
| KR | 10-2013-0080041 A | 7/2013 | |
| KR | 10-1310423 B1 | 9/2013 | |
| KR | 10-2014-0064093 A | 5/2014 | |
| KR | 10-1494983 B1 | 2/2015 | |
| KR | 10-2017-0041131 A | 4/2017 | |
| KR | 10-2018-0129433 A | 12/2018 | |
| WO | WO-2016027673 A1 * | 2/2016 | .......... H01M 50/543 |
| WO | WO 2018/155281 A1 | 8/2018 | |

OTHER PUBLICATIONS

Machine translation of WO 2018155281 A1 (Year: 2018).*
Machine translation of WO 2016027673 A1 (Year: 2016).*
International Search Report for PCT/KR2019/015085 (PCT/ISA/210) dated Feb. 25, 2020.
Extended European Search Report for European Application No. 19892391.4, dated Sep. 30, 2021.

* cited by examiner

BATTERY MODULE WITH IMPROVED SAFETY, BATTERY PACK INCLUDING THE BATTERY MODULE AND VEHICLE INCLUDING THE BATTERY PACK

TECHNICAL FIELD

The present disclosure relates to a battery module, and more particularly to a battery module that may block the current flow when the temperature rises. The present disclosure also relates to a battery pack including the battery module and a vehicle including the battery pack. The present application claims priority to Korean Patent Application No. 10-2018-0157556 filed on Dec. 7, 2018 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active materials and negative electrode active materials, respectively. The lithium secondary battery includes an electrode assembly that assembles a unit cell having a structure in which a positive electrode plate having a positive electrode active material coated on a positive electrode current collector and a negative electrode plate having a negative electrode active material coated on a negative electrode current collector are arranged with a separator interposed therebetween, and a sheath material, that is, a battery case, that seals and accommodates the assembly together with an electrolyte solution. According to the shape of the battery case, lithium secondary batteries are classified into can type secondary batteries in which the electrode assembly is embedded in a metal can and pouch type secondary batteries in which the electrode assembly is embedded in an aluminum laminated sheet pouch.

Recently, secondary batteries are widely used not only in small devices such as portable electronic devices but also in medium and large devices such as vehicles and energy storage systems (ESSs). When secondary batteries are used in such medium and large devices, a large number of secondary batteries are electrically connected to form a battery module or a battery pack in order to increase capacity and output power. In particular, pouch type secondary batteries are widely used in such medium large devices because of advantages such as easy lamination and light weight. Pouch type secondary batteries have a structure in which an electrode assembly to which an electrode lead is connected is accommodated in a pouch case with an electrolyte solution and sealed. A part of the electrode lead is exposed outside the pouch case, and the exposed electrode lead is electrically connected to a device to which secondary batteries are mounted or is used to electrically connect secondary batteries to each other.

FIG. 1 illustrates a part of a battery module manufactured by connecting pouch type battery cells. For example, a state in which two pouch type battery cells are connected in series is shown.

As shown in FIG. 1, pouch type battery cells 10 and 10' include two electrode leads 40 and 40' drawn out of a pouch case 30. The electrode leads 40 and 40' are divided into a positive electrode lead (+) and a negative electrode (−) lead according to an electrical polarity, and are electrically connected to an electrode assembly 20 sealed in the pouch case 30. That is, the positive electrode lead is electrically connected to a positive electrode plate of the electrode assembly 20, and the negative electrode lead is electrically connected to a negative electrode plate of the electrode assembly 20.

There may be various ways of connecting the battery cells 10 and 10' inside the battery module 1. FIG. 1 shows a method of bending the electrode leads 40 and 40' and then placing the electrode leads 40 and 40' on a bus bar 50, performing a welding process on the electrode leads 40 and 40' by laser welding, and connecting the electrode lead 40 of the battery cell 10 and the electrode lead 40' of the other battery cell 10' adjacent to the battery cell 10.

Meanwhile, lithium secondary batteries have a risk of explosion when overheated. In particular, as lithium secondary batteries are applied to electric vehicles including electric vehicles (EVs), hybrid electric vehicles (HEVs), plug-in hybrid electric vehicles (PHEVs), etc., in battery modules or battery packs that connect and use a large number of high capacity secondary battery cells, a major accident may occur when an explosion occurs, and thus securing safety is one of main solutions.

A representative cause of a rapid rise in the temperature of a lithium secondary battery is when a short circuit current flows. Short circuit current mainly occurs when a short circuit occurs in an electronic device connected to a secondary battery, and when the short circuit occurs in the lithium secondary battery, a rapid electrochemical reaction occurs in a positive electrode and a negative electrode to generate heat. The generated heat causes the temperature of the battery cell to rise rapidly, causing ignition. In particular, in the case of a battery module or a battery pack including a plurality of battery cells, heat generated from one battery cell is propagated to the surrounding battery cells and affects other battery cells, which increases with a greater risk.

Conventionally, a positive temperature coefficient (PTC) device, a fuse, etc. have been proposed as a means of preventing explosion by blocking current when the temperature inside the secondary battery rises. However, they have a problem in that a separate mounting space is required in a battery module or a battery pack.

Securing safety is very important in that explosion of a battery module or a battery pack not only may cause damage to electronic devices or vehicles, etc., to which it is employed, but also may lead to the safety threat of users and ignition. If the secondary battery is overheated, the risk of explosion and/or ignition increases, and sudden combustion or explosion due to overheating may cause injury to people and property. Therefore, there is a demand for introducing means for sufficiently securing safety in use of secondary batteries.

DISCLOSURE

Technical Problem

The present disclosure is designed to solve the problems of the related art, and therefore the present disclosure is directed to providing a battery module with improved safety by blocking current when the temperature rises, a battery pack including the battery module, and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including two or more battery cells, wherein the two or more battery cells are pouch type secondary batteries, each battery cell having an electrode assembly having ends respectively connected to a first end of an electrode leads of opposite polarities is sealed in a pouch case together with an electrolyte and a second end of each electrode lead exposed to an outside of the pouch case, wherein the electrode leads and a bus bar are connected to a first battery cell and a second battery cell of the two or more battery cells, wherein the bus bar comprises a metal layer and a material layer that is conductive, but capable of acting as a resistor above a predetermined temperature, and wherein the material layer comprises a gas generating material that is decomposed at the predetermined temperature or higher to generate a gas and increase resistance.

The material layer may further include a conductive material and an adhesive.

The gas generating material may be melamine cyanurate.

The conductive materials may be connected and fixed to each other by the adhesive, and when the gas is generated, the conductive materials may be disconnected to increase resistance.

The bus bar may include a block and a body. The block is connected to the electrode leads, the block being separate from the body and embedded in the body and a surface of the block is exposed to an outside. The material layer may be interposed between the body and the block.

The bus bar may include a first block connected to an electrode lead of the first battery cell and a second block connected to an electrode lead of the second battery cell, and a current flow path from the first battery cell to the second battery cell may be provided along the electrode lead of the first battery cell, the first block, a first material layer interposed between the body and the first block, a second material layer interposed between the body and the second block, the second block, and the electrode lead of the second battery cell, in order.

The first battery cell and the second battery cell may be connected in series through the bus bar. The first battery cell and the second battery cell may be stacked such that respective electrode leads are stacked to have opposite polarities, and the second end of the electrode lead of the first battery cell and the second end of the electrode lead of the second battery cell may be bent toward each other in a stack direction and the bus bar may be disposed in parallel to the stack direction between bent portions of the respective electrode leads such that the respective electrode leads are connected.

The bus bar may be in a plate shape with a thickness less than a length and a width and be provided with grooves through which the electrode leads penetrate.

In another aspect of the present disclosure, there is provided a battery pack including at least one battery module according to the present disclosure; and a pack case configured to package the at least one battery module.

In another aspect of the present disclosure, there is provided a vehicle including at least one battery pack according to the present disclosure.

Advantageous Effects

According to the present disclosure, a battery module is configured by changing a bus bar while remaining battery cells unchanged. The resistance of the bus bar increases when the temperature rises, and thus a current flow may be blocked through the bus bar. Therefore, when the battery module according to the present disclosure is overheated during use, the current flow may be blocked, thereby ensuring safety in an abnormal circumstance.

As a configuration of increasing the resistance of the bus bar, a material layer including a gas generating material is included in the bus bar such that the current flow is blocked when reaching a temperature at which the gas generating material is decomposed. Therefore, even when a secondary battery protection circuit does not operate, it is possible to block the flow of current such that no more current flows, for example, to prevent charging, thereby increasing the safety of the battery module. As described above, the battery module of the present disclosure implements means that automatically blocks the flow of current when the temperature rises by improving the bus bar, thereby securing the safety of the battery module doubly together with an overcharge protection function of the secondary battery protection circuit.

According to the present disclosure, a battery module may be provide using a bus bar capable of securing safety when connecting adjacent battery cells to form an electrical connection path. When an event such as reaching an abnormal temperature occurs, the resistance of the bus bar increases when the gas generating material included in the material layer in the bus bar is decomposed. As a result, the electrical connection between the battery cells is also released, which blocks the current flow, thereby ensuring the safety of the battery module.

According to the present disclosure, safety is ensured by improving the bus bar of the battery module. Except that the bus bar proposed in the present disclosure is used instead of the conventional bus bar, there is an advantage that the safety of the battery module may be secured without a relatively change to the process because the existing battery module manufacturing process may be used as it is. Since the battery cells themselves use the existing manufacturing process, a process change or an adjustment to a mass production process is not necessary.

As described above, according to the present disclosure, the current flow is secured under normal circumstances and the performance of the battery module similar to the existing one is attained, and the safety of the battery module may be improved by blocking the current flow when the temperature rises to a certain temperature or more due to abnormal circumstances. Therefore, the safety of the battery module, the battery pack including the battery module, and the vehicle including the battery pack may be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
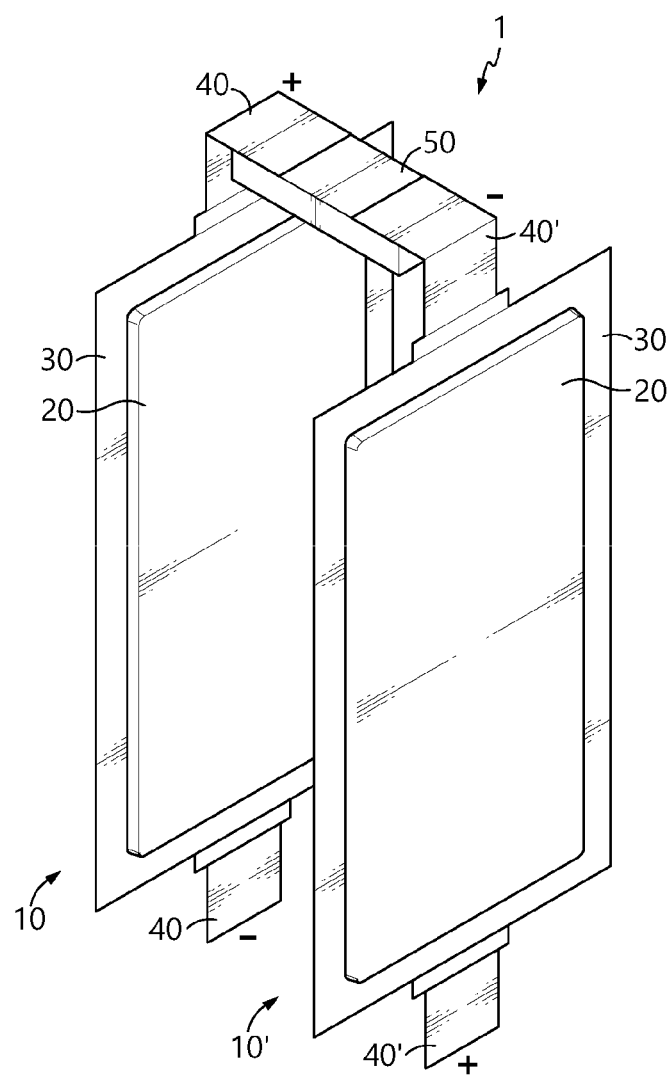
FIG. 1 schematically shows a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure. The same reference numerals in the drawings denote the same elements.

In the embodiments described below, a secondary battery refers to a lithium secondary battery. Here, the lithium secondary battery is collectively referred to as a secondary battery in which lithium ions act as operating ions during charging and discharging to cause an electrochemical reaction in a positive electrode plate and a negative electrode plate.

Meanwhile, even if the name of the secondary battery changes depending on the type of an electrolyte or a separator used in the lithium secondary battery, the type of a battery case used to package the secondary battery, the structure of the inside or outside of the lithium secondary battery, etc, all secondary batteries in which lithium ions are used as operating ions should be interpreted as being included in the category of the lithium secondary battery.

The present disclosure is also applicable to secondary batteries other than the lithium secondary battery. Therefore, even if the operating ion is not the lithium ion, all secondary batteries to which the technical idea of the present disclosure may be applied should be interpreted as being included in the scope of the present disclosure regardless of their types.

Hereinafter, an embodiment of the present disclosure will be described with reference to accompanying FIGS. 2 to 5.

Figure 2:
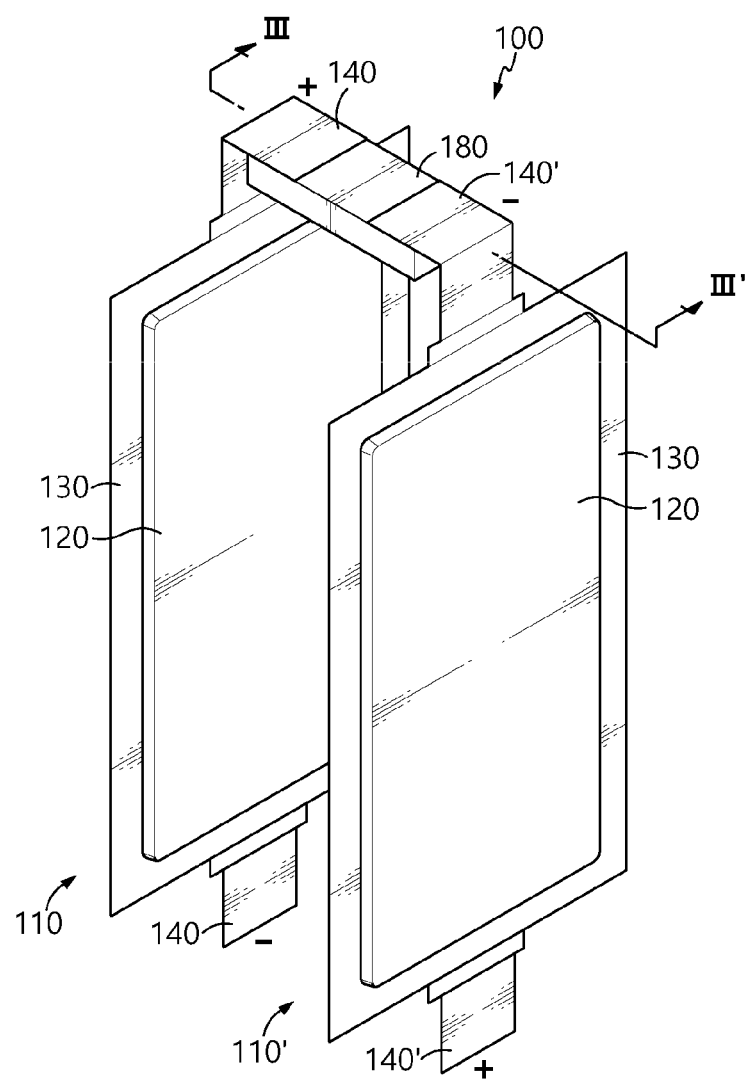
FIG. 2 is a schematic view of a battery module according to an embodiment of the present disclosure.
Figure 3:
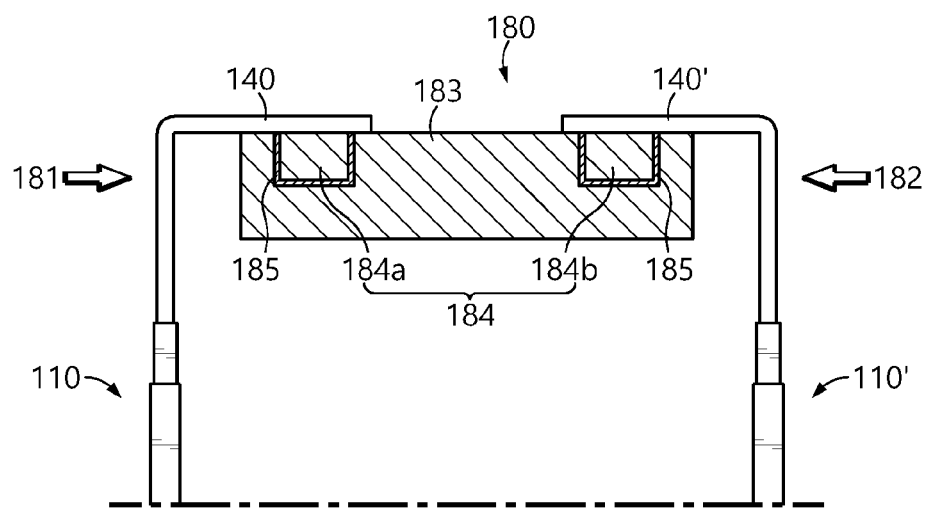
FIG. 3 is a cross-sectional view showing a coupling state between a bus bar and electrode leads in FIG. 2.
Figure 4:
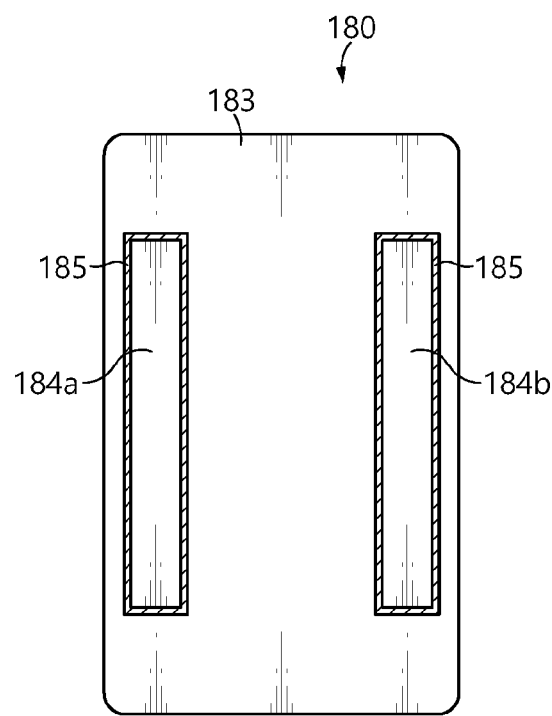
FIG. 4 is a top view of a bus bar included in a battery module according to an embodiment of the present disclosure.

FIG. 2 is a schematic view of a battery module according to an embodiment of the present disclosure. FIG. 3 is a cross-sectional view showing a coupling state between a bus bar and electrode leads in FIG. 2. FIG. 4 is a top view of a bus bar included in a battery module according to an embodiment of the present disclosure.

As shown in FIG. 2, a battery module 100 includes battery cells 110 and 110' and a bus bar 180. Although a larger number of battery cells may be included in the battery module 100, some of them will be shown for convenience of illustration. For example, the state where the two pouch type battery cells 110 and 110' are connected in series is shown. However, this is merely exemplary and the present disclosure is not limited to this connection method.

The battery cells 110 and 110' are secondary batteries and include two electrode leads 140 and 140' drawn out of a pouch case 130. The electrode leads 140 and 140' are divided into a positive electrode (+) lead and a negative electrode (−) lead according to electrical polarities, and are electrically connected to an electrode assembly 120 sealed in the pouch case 130. That is, the positive electrode lead is electrically connected to a positive electrode plate of the electrode assembly 120, and the negative electrode lead is electrically connected to a negative electrode plate of the electrode assembly 120. As such, the battery cells 110 and 110' are pouch type secondary batteries having a structure in which the electrode assembly 120 having both ends respectively connected to one ends of the electrode leads 140 and 140' of opposite polarities is accommodated and sealed in the pouch case 130 together with an electrolyte and the other ends of the electrode leads 140 and 140' are exposed to the outside of the pouch case 130.

FIG. 3 corresponds to a cross-section taken along the line III-III' of FIG. 2. As shown in FIG. 3, in the battery module 100, the bus bar 180 is used to electrically connect the first battery cell 110 and the second battery cell 110'. Specifically, the electrode lead 140 of the battery cell 110 and the electrode lead 140' of the other battery cell 110' adjacent thereto are bent and then connected to the bus bar 180. The first battery cell 110 and the second battery cell 110' are stacked such that the electrode leads 140 and 140' have opposite polarities, and the other end of the electrode leads 140 of the first battery cell 110 and the other end of the electrode lead 140' of the second battery cell 110' are bent toward each other along the stack direction. The bus bar 180 is disposed in parallel to the stack direction between bent portions of the electrode leads 140 and 140' such that the electrode leads 140 and 140' are connected to each other. A connection method may use a method conventionally used in the art. For example, the electrode leads 140 and 140' may be coupled and connected by ultrasonic welding, but are not limited thereto.

In the present disclosure, as shown through FIGS. 2 and 3, one battery cell 110 is positioned on a left surface 181 of the bus bar 180, and the other battery cell 110' is positioned on a right surface 182. Each of the electrode leads 140 and 140' is connected to a block 184, and thus the electrode leads 140 and 140' are electrically connected to each other through the bus bar 180. In particular, the first battery cell 110 and the second battery cell 110' are connected in series through the bus bar 180.

More specifically, the bus bar 180 includes a first block 184*a* connected to the electrode lead 140 of the first battery cell 110 and a second block 184*b* connected to the electrode lead 140' of the second battery cell 110'. The current flow path from the first battery cell 110 to the second battery cell 110' is provided in an order along the electrode lead 140 of the first battery cell 110, the first block 184a, a material layer 185 interposed between a body 183 and the first block 184a, the body 183, the material layer 185 interposed between the body 183 and the second block 184b, the second block 184b and the electrode lead 140' of the second battery cell 110'.

Referring to FIG. 3 and further referring to FIG. 4, the bus bar 180 is in an approximately plate shape with a thin thickness compared to a length and a width. The particular difference between the bus bar 180 and the existing bus bar is a portion of the bus bar 180 which is connected to the electrode leads 140 and 140'. This portion is the block 184. The block 184 which is the portion separated from the body 183 of the bus bar 180 is embedded in the body 183 and has a surface exposed to the outside. In addition, the material layer 185 is interposed between the body 183 and the block 184.

The bus bar 180 may vary in the shape and the size so as to implement various electrical connection relationships. In general, the bus bar 180 is applied to a battery module manufacturing process as an ICB assembly in which an electrically conductive, for example, metal bus bar is combined on a frame of a plastic material in consideration of a wiring relationship rather than being used alone. The shape of the frame and the shape of the bus bar combined with the frame vary according to the connection relationship of the battery module. Thus, it will be apparent to those skilled in the art that various modifications of the present disclosure are possible.

In the bus bar 180, the body 183 and the block 184 are metal layers. The body 183 and the block 184 may be the same material. In addition, the material layer 185 is a material that is normally conductive but may act as a resistor when the temperature rises. As such, the material layer 185 is sandwiched between the body 183, which is the metal layer, and the block 184.

The material layer 185 includes a gas generating material that is decomposed at a predetermined temperature or higher to generate gas and increase resistance. Preferably, the material layer 185 includes the gas generating material, a conductive material and an adhesive. The conductive materials are connected and fixed to each other by the adhesive, and when the gas is generated in the gas generating material, the conductive materials may be disconnected to increase resistance.

The gas generating material is preferably melamine cyanurate. Melamine cyanurate is a material used as a nitrogen-phosphorous flame retardant component in which nitrogen and phosphorus are combined, and may be obtained as a raw material having an average particle size of several tens of um through various manufacturers.

Melamine cyanurate which is commonly used for a flame retardant application undergoes endothermic decomposition with the temperature exceeding about 300° C. Melamine cyanurate is decomposed into melamine and cyanuric acid. Vaporized melamine emits inert nitrogen gas. The molecular weight of melamine cyanurate may be adjusted to control the decomposition temperature. The structural formula of melamine cyanurate is as follows.

[Structural Formula]

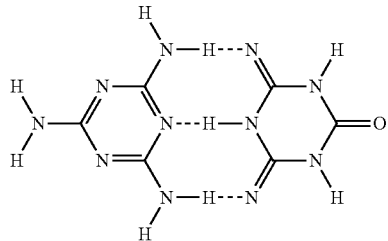

The conductive material is not particularly limited as long as it has conductivity, and may use, for example, graphite such as natural graphite and artificial graphite; carbon blacks such as carbon black, acetylene black, ketjen black, channel black, furnace black, lamp black, and summer black; conductive fibers such as carbon fibers and metal fibers; metal powders such as carbon fluoride powder, aluminum powder and nickel powder; conductive whiskers such as zinc oxide and potassium titanate; conductive metal oxides such as titanium oxide; conductive materials such as polyphenylene derivatives, and the like.

The adhesive is a component that assists in the bonding of the gas generating material and the conductive material and the bonding of the body 183 and the block 184. Examples of the adhesive may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers, and the like.

When the temperature rises to a certain temperature due to an abnormal circumstance, for example, when the temperature rises to 300° C. or higher, melamine cyanurate is decomposed and $N_2$ gas is generated in the material layer 185 inserted between the body 183 and the block 184. Accordingly, the material layer 185 increases in resistance to operate as a resistance layer. The material layer 185 may also serve to break electrical connections through volume expansion.

The overall size of the bus bar 180 may be the same as that of the existing bus bar. Materials of the body 183 and the block 184 may be the same as those of the existing bus bar. The normal electrical conductivity of the material layer 185 may be similar to the electrical conductivity of the existing bus bar by making the conductive material in the material layer 185 equal to or higher than that of the existing bus bar.

Therefore, in a normal circumstance, the conductivity of the material layer 185 in the bus bar 180 may be maintained, thereby expressing the performance of a battery module similar to that of the existing bus bar. When the temperature rises to the certain temperature due to the abnormal circumstance, since the resistance of the material layer 185 increases, a current flow may be blocked. Accordingly, when the temperature rises, the material layer 185 operates as a resistor to block the current, thereby improving the safety of a battery module including a battery cell manufactured to include the material layer 185.

Specifically, no current flows from the material layer 185 to the body 183 at a certain temperature at which the gas generating material of the material layer 185 is decomposed. In addition, no current flows from the material layer 185 to the first block 184a or the second block 184b. Therefore, at the certain temperature at which the gas generating material of the material layer 185 is decomposed, a current flow path from the first battery cell 110 to the second battery cell 110' and a current flow path from the second battery cell 110' to the first battery cell 110 are blocked.

As such, in the present disclosure, the bus bar 180 of which resistance increases when the temperature rises is configured between the battery cells 110 and 110' and thus the current flow through the bus bar 180 is blocked when the battery module 100 is overheated and reaches the temperature at which the gas generating material of the material layer 185 in the bus bar 180 is decomposed. Therefore, even when a secondary battery protection circuit does not operate, it is possible to block the flow of current such that no more current flows, for example, to prevent charging, thereby increasing the safety of the battery module 100. As described above, the battery module 100 of the present disclosure implements means that automatically blocks the flow of current when the temperature rises by improving the bus bar 180, thereby securing the safety of the battery module doubly together with an overcharge protection function of the secondary battery protection circuit.

In particular, in the present embodiment, instead of the bus bar 180 having a simple layer stack structure, the block 184 is embedded in the body 183. The embedded block 184 is more difficult to be separated from the body 183 than in the simple layer stack structure and is structurally robust because there is no problem of being slipped and separated like a slip.

As such, according to the present disclosure, the safety of the battery module 100 is secured through the improvement of the bus bar 180 of the battery module 100. Instead of using the existing bus bar, the bus bar 180 according to the present disclosure is used to manufacture the battery module 100, and the existing battery cell manufacturing process is used as it is, and thus it is also advantageous that a change to the process or an adjustment to the mass production process is not necessary.

As described above, according to the present disclosure, the conductivity of the material layer 185 in the bus bar 180 is maintained under normal circumstances and the performance of the battery module similar to that of the existing battery module is expressed, and the safety of the battery module 100 may be improved by blocking the current flow when the temperature rises to a certain temperature or more due to an abnormal circumstance. Therefore, the safety of the battery module 100, the battery pack including the battery module, and the vehicle including the battery pack may be improved.

Figure 5:
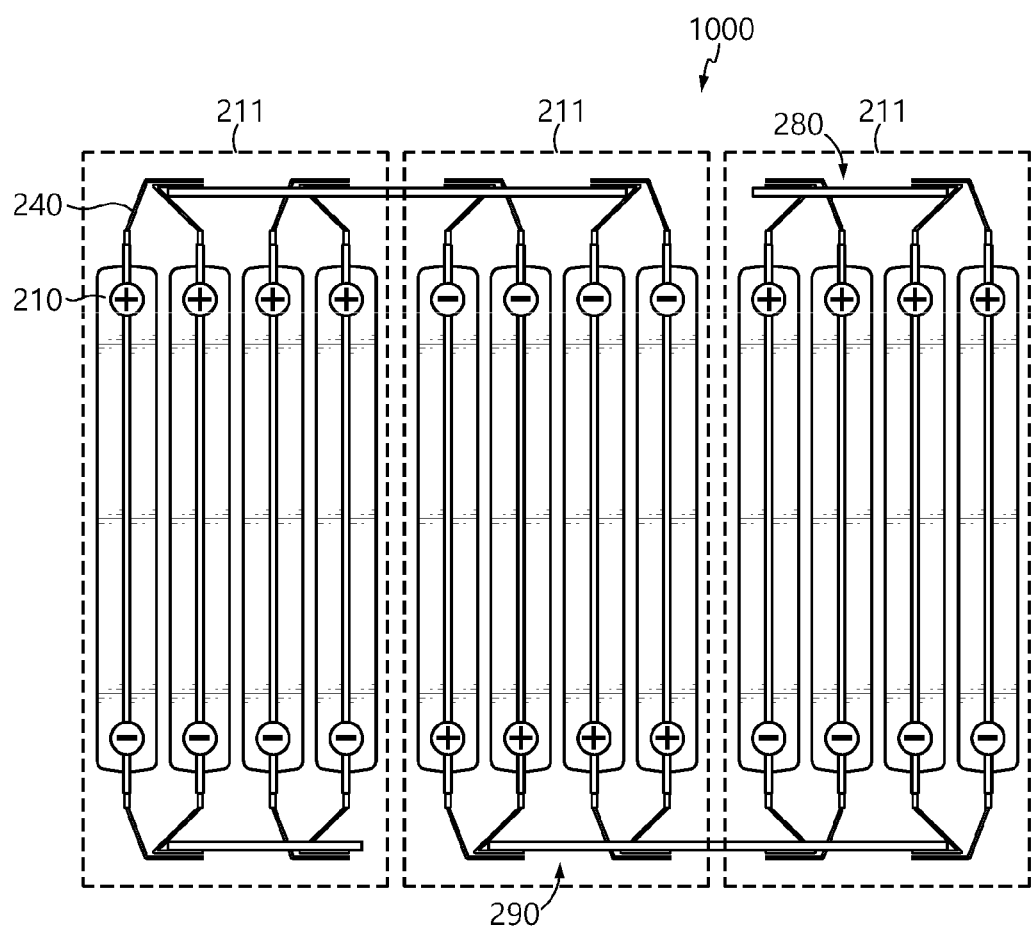
FIG. 5 is a cross-sectional view schematically showing a battery module according to another embodiment of the present disclosure.
Figure 6:
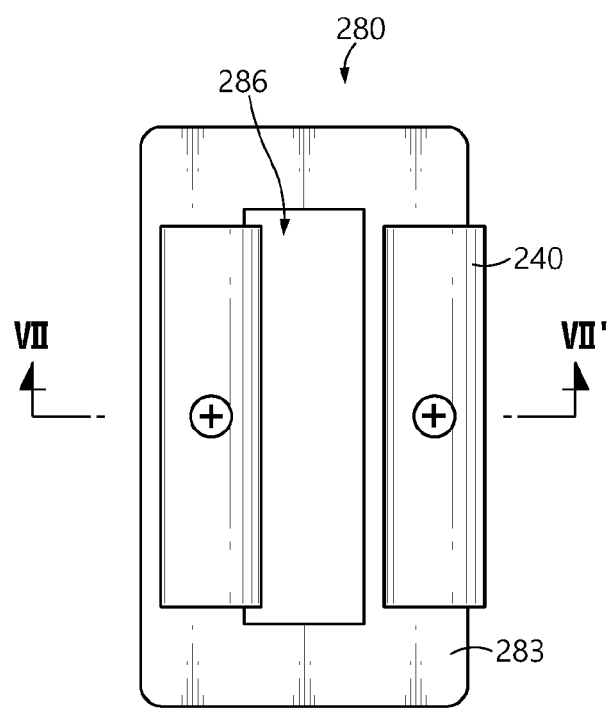
FIG. 6 is a top view of a portion of a first bus bar included in the battery module of FIG. 5.
Figure 7:
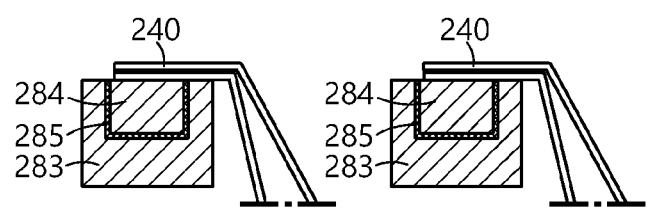
FIG. 7 is a cross-sectional view thereof.
Figure 8:
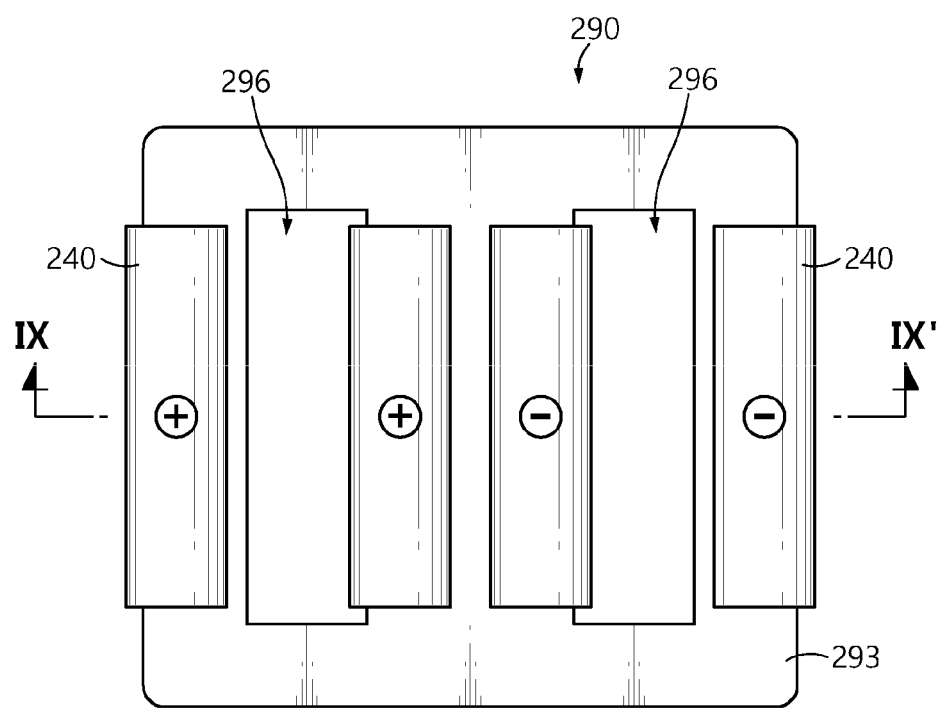
FIG. 8 is a top view of a portion of a second bus bar included in the battery module of FIG. 5.
Figure 9:
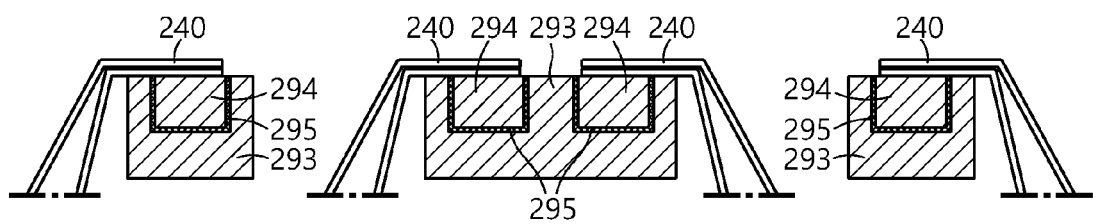
FIG. 9 is a cross-sectional view thereof.

FIG. 5 is a cross-sectional view schematically showing a battery module according to another embodiment of the present disclosure. FIG. 6 is a top view of a portion of a first bus bar included in the battery module of FIG. 5, and FIG. 7 is a cross-sectional view taken along line VII-VII' of FIG. 6. FIG. 8 is a top view of a portion of a second bus bar included in the battery module of FIG. 5, and FIG. 9 is a cross-sectional taken along line IX-IX' of FIG. 8.

A battery module 1000 of FIG. 5 illustrates an example of a 4P3S connection. That is, three cell banks 211 in which four battery cells 210 are connected in parallel (P) are connected in series (S). Each of the battery cells 210 may be a pouch type battery cell as shown in FIG. 2, etc., and the battery cells 210 may have the same structure as the battery cell 110.

Electrode leads 240 protrude from both ends of the battery cell 210. The electrode leads 240 are stacked to have the same polarity in the cell banks 211 connected in parallel. The electrode leads 240 are stacked to have opposite polarities between the cell banks 211. There may be a variety of ways in which the electrode leads 240 are connected. In FIGS. 5 to 9, a structure in which the other ends of the electrode leads 240 are bent to the left or the right to provide a flat contact surface, and then the other ends are overlapped and connected by welding is shown.

Referring to FIGS. 5 to 9, the first bus bar 280 is for connecting the electrode leads 240 of the same polarity in one cell bank 211, and the second bus bar 290 is also for connecting the electrode leads 240 of different polarities between the two cell banks 211.

The first bus bar 280 and the second bus bar 290 are respectively provided with grooves 286 and 296 through which the electrode leads 240 penetrate. In addition, the first bus bar 280 and the second bus bar 290 are similar to the bus bar 180 described in the previous embodiment. That is, the first bus bar 280 includes a body 283, a block 284, and a material layer 285, and the second bus bar 290 also includes a body 293, a block 294, and a material layer 295.

The material layers 285 and 295 are the same as the material layers 185 described above, and are conductive in normal circumstances, but may act as resistors when the temperature rises, thereby blocking an electrical connection between the battery cells 210. In addition, with respect to the present embodiment, the description provided in the previous embodiment may be used as it is.

Generation of a short circuit current is the representative cause of deterioration of safety due to the rapid rise in temperature of a lithium secondary battery. It is very important to ensure the safety in the short circuit in the safety of a battery module in which multiple battery cells are connected or a battery pack. The lower the short circuit resistance, the higher the short circuit current flows to generate a great amount of heat, and if the battery cell becomes unbearable, ignition occurs. Some safety results are obtained when the short circuit resistance is very low, where heat generated by the flow of high current exceeds 660° C. and electrode leads melt, resulting in a break in a current flow to ensure the safety. When the generated heat is lower than 660° C., because the electrode leads do not melt, the flow of current continues, a high heat is accumulated, and the battery cells are unbearable, causing ignition to occur. Meanwhile, the high current may flow even under normal circumstances. In an electric vehicle, a large current flows in the battery module during rapid charging, rapid acceleration, or starting, causing a high temperature to occur in the electrode leads. In such an abnormal circumstance, the electric vehicle must not operate. To prevent this, it is necessary to block the flow of current at a temperature of about 250° C. or higher.

In the present embodiment, when the battery module 1000 reaches about 300° C., gas is generated in the material layers 285 and 295 to increase the resistance of the material layers 285 and 295. Accordingly, the battery module 1000 does not operate in the normal high current range but operates only when an actual short circuit occurs and is overheated at a temperature equal to or higher than 300° C., thereby ensuring safety against ignition, explosion, etc. There is also an advantage that an energy density is not reduced since it does not occupy a space in the module, such as a PTC device or a fuse which is a different safety enhancing device.

Since the battery module according to the present disclosure has excellent safety, the battery module is also suitable for use as a power source for a medium and large device requiring high temperature stability, long cycle characteristics, high rate characteristics, etc. Preferred examples of the medium and large device include a power tool that is driven by an electric motor; electric vehicles including EV, HEV, PHEV, and the like; electric motorcycles including e-bikes and e-scooters; electric golf carts; and ESS, but are not limited thereto.

Figure 10:
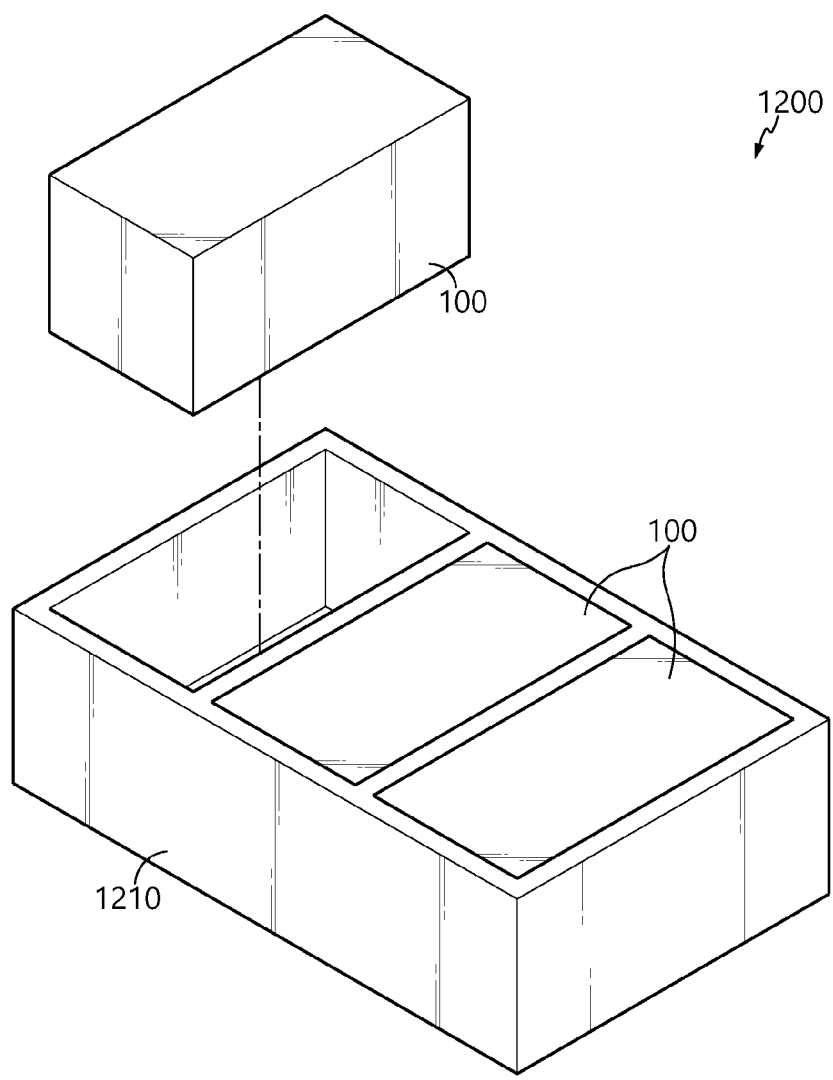
FIG. 10 is a diagram illustrating a battery pack according to still another embodiment of the present disclosure.
Figure 11:
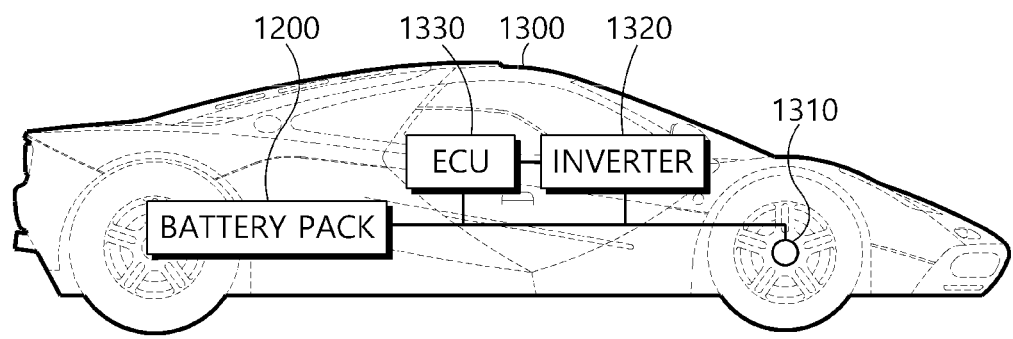
FIG. 11 is a diagram illustrating a vehicle according to still another embodiment of the present disclosure.

FIG. 10 is a diagram illustrating a battery pack according to an embodiment of the present disclosure. FIG. 11 is a diagram illustrating a vehicle according to an embodiment of the present disclosure.

Referring to FIGS. 10 and 11, a battery pack 1200 may include at least one battery module according to the foregoing embodiment, for example, the battery module 100 of the second embodiment and a pack case 1210 for packaging the battery pack 1200. In addition, the battery pack 1200 according to the present disclosure, in addition to the battery module 100 and the pack case 1210, may further include various devices for controlling charging and discharging of the battery module 100, such as a battery management system (BMS), a current sensor, a fuse, etc.

The battery pack 1200 may be provided in a vehicle 1300 as a fuel source of the vehicle 1300. For example, the battery pack 1200 may be provided in the vehicle 1300 in other ways that may utilize electric vehicles, hybrid vehicles, and the other battery pack 1200 as fuel sources.

Preferably, the vehicle 1300 may be an electric vehicle. The battery pack 1200 may be used as an electric energy source that drives the vehicle 1300 by providing a driving force to a motor 1310 of the electric vehicle. In this case, the battery pack 1200 has a high nominal voltage of 100V or higher. In a hybrid vehicle, the battery pack 1200 is set to 270V.

The battery pack 1200 may be charged or discharged by an inverter 1320 according to the driving of the motor 1310 and/or an internal combustion engine. The battery pack 1200 may be charged by a regenerative charging device coupled with a break. The battery pack 1200 may be electrically connected to the motor 1310 of the vehicle 1300 through the inverter 1320.

As described above, the battery pack 1200 also includes the BMS. The BMS estimates the state of battery cells in the battery pack 1200 and manages the battery pack 1200 using estimated state information. For example, the BMS estimates and manages state information of the battery pack 1200 such as state of charge (SOC) of the battery pack 1200, state of health (SOH), maximum input/output power allowance, output voltage, etc. In addition, the BMS may use the state information to control the charging or discharging of the battery pack 1200, and further, estimate the replacement time of the battery pack 1200.

An ECU 1330 is an electronic control device for controlling the state of the vehicle 300. For example, the ECU 1330 determines torque information based on information such as an accelerator, a brake, a speed, etc., and controls the output of the motor 1310 to match the torque information. In addition, the ECU 1330 transmits a control signal to the inverter 1320 such that the battery pack 1200 may be charged or discharged based on the state information such as SOC and SOH of the battery pack 1200 received by the BMS. The inverter 1320 causes the battery pack 1200 to be charged or discharged based on the control signal of the ECU 1330. The motor 1310 drives the vehicle 1300 based on control information (e.g., torque information) transmitted from the ECU 1330 using electric energy of the battery pack 1200.

The vehicle 1300 includes the battery pack 1200 according to the present disclosure. The battery pack 1200 includes the battery module 100 with improved safety as described above. Therefore, the stability of the battery pack 1200 is improved, the battery pack 1200 is excellent in stability and may be used for a long time, and thus the vehicle 1300 including the battery pack 1200 is safe and easy to operate.

In addition, the battery pack 1200 may also be provided in other devices, equipment, and facilities, such as an ESS using a secondary battery, in addition to the vehicle 1300.

As such, the battery pack 1200 according to the present embodiment and devices or equipment and facilities including the battery pack 1200, such as the vehicle 1300, include the battery module 100 described above, and thus the battery pack 1200 having all the advantages owing to the battery module 100 described above and devices or equipment and facilities such as the vehicle 1300 including the battery pack 1200 may be implemented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:
   two or more battery cells, wherein the two or more battery cells are pouch type secondary batteries, each battery cell having an electrode assembly having ends respectively connected to a first end of an electrode lead of opposite polarities sealed in a pouch case together with an electrolyte and a second end of each electrode lead exposed to an outside of the pouch case,
   wherein the electrode leads and a bus bar are connected to a first battery cell and a second battery cell of the two or more battery cells,
   wherein the bus bar comprises a metal layer and a material layer that is conductive, but capable of acting as a resistor above a predetermined temperature,
   wherein the material layer comprises a gas generating material that is decomposed at the predetermined temperature or higher to generate a gas and increase resistance, and
   wherein the bus bar includes a block and a body, the block being connected to the electrode leads, the block embedded in a first surface of the body, a surface of the block being exposed to an outside coplanar with the first surface of the body, the material layer being interposed between the body and the block to separate the block from the body.

2. The battery module of claim 1, wherein the material layer further comprises a conductive material, and an adhesive.

3. The battery module of claim 1, wherein the gas generating material is melamine cyanurate.

4. The battery module of claim 2, wherein the conductive materials are connected and fixed to each other by the adhesive, and when the gas is generated, the conductive materials are disconnected to increase resistance.

5. The battery module of claim 1, wherein the block comprises:
   a first block connected to an electrode lead of the first battery cell; and
   a second block connected to an electrode lead of the second battery cell,
   wherein a current flow path from the first battery cell to the second battery cell is provided along the electrode lead of the first battery cell, the first block, a first material layer interposed between the body and the first block, a second material layer interposed between the body and the second block, the second block, and the electrode lead of the second battery cell, in order.

6. The battery module of claim 1, wherein the first battery cell and the second battery cell are connected in series through the bus bar.

7. The battery module of claim 6, wherein the first battery cell and the second battery cell are stacked such that respective electrode leads are stacked to have opposite polarities, and the second end of the electrode lead of the first battery cell and the second end of the electrode lead of the second battery cell are bent toward each other in a stack direction and the bus bar is disposed in parallel to the stack direction between bent portions of the respective electrode leads such that the respective electrode leads are connected.

8. The battery module of claim 1, wherein the bus bar is in a plate shape with a thickness less than a length and a width and is provided with grooves through which the electrode leads penetrate.

9. A battery pack comprising:
   at least one battery module according to claim 1; and
   a pack case configured to package the at least one battery module.

10. A vehicle comprising at least one battery pack according to claim 9.

11. The battery module of claim 1, wherein the material layer extends below an outer surface of the bus bar.

12. The battery module of claim 1, wherein the material layer prevents direct contact of the body with the block.

13. The battery module of claim 1, wherein the body and the block are formed of the metal layer.

* * * * *